United States Patent
Bates, III et al.

(10) Patent No.: US 6,726,369 B1
(45) Date of Patent: Apr. 27, 2004

(54) FIELD REPAIRABLE, BREAKAWAY HOUSING FOR OPTICAL FIBER CONNECTOR

(75) Inventors: Charles Linsday Bates, III, Laguna Hills, CA (US); James Edward Novacoski, Yucaipa, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 3 days.

(21) Appl. No.: 10/387,302

(22) Filed: Mar. 11, 2003

(51) Int. Cl.$^7$ .................................................. G02B 6/36
(52) U.S. Cl. ........................................... 385/53; 385/92
(58) Field of Search ............................... 385/53, 92, 58, 385/75, 83

(56) References Cited

U.S. PATENT DOCUMENTS 5,943,460 A  * 8/1999 Mead et al. .................... 385/81
6,254,283 B1 * 7/2001 Novacoski et al. ............. 385/78
6,626,582 B2 * 9/2003 Farrar et al. .................... 385/53

* cited by examiner

Primary Examiner—Chandrika Prasad
(74) Attorney, Agent, or Firm—Roger C. Turner

(57) ABSTRACT

An optic fiber connector includes a housing (20) with a through passageway (70) and an optic fiber terminus assembly (22) lying in the passageway, the connector having a simple retainer assembly means prevents inadvertent rearward pullout of the terminus assembly from the passageway but which enables simple removal of the terminus assembly when desired. The housing has a rear portion with a groove (94) that extends circumferentially about the housing to weaken it at the groove, the groove lying forward of a retainer part 71 formed by a pair of housing projections (74, 76). A rear part (96) of the housing can be broken off from the main part (92) of the housing at the groove, to thereby remove the retainer part on the housing and allow the terminus assembly to be removed from the housing and inserted into a new housing. The rear part of the housing is broken when the cable is pulled partially rearward and at perhaps 45° to the housing axis (76).

11 Claims, 2 Drawing Sheets

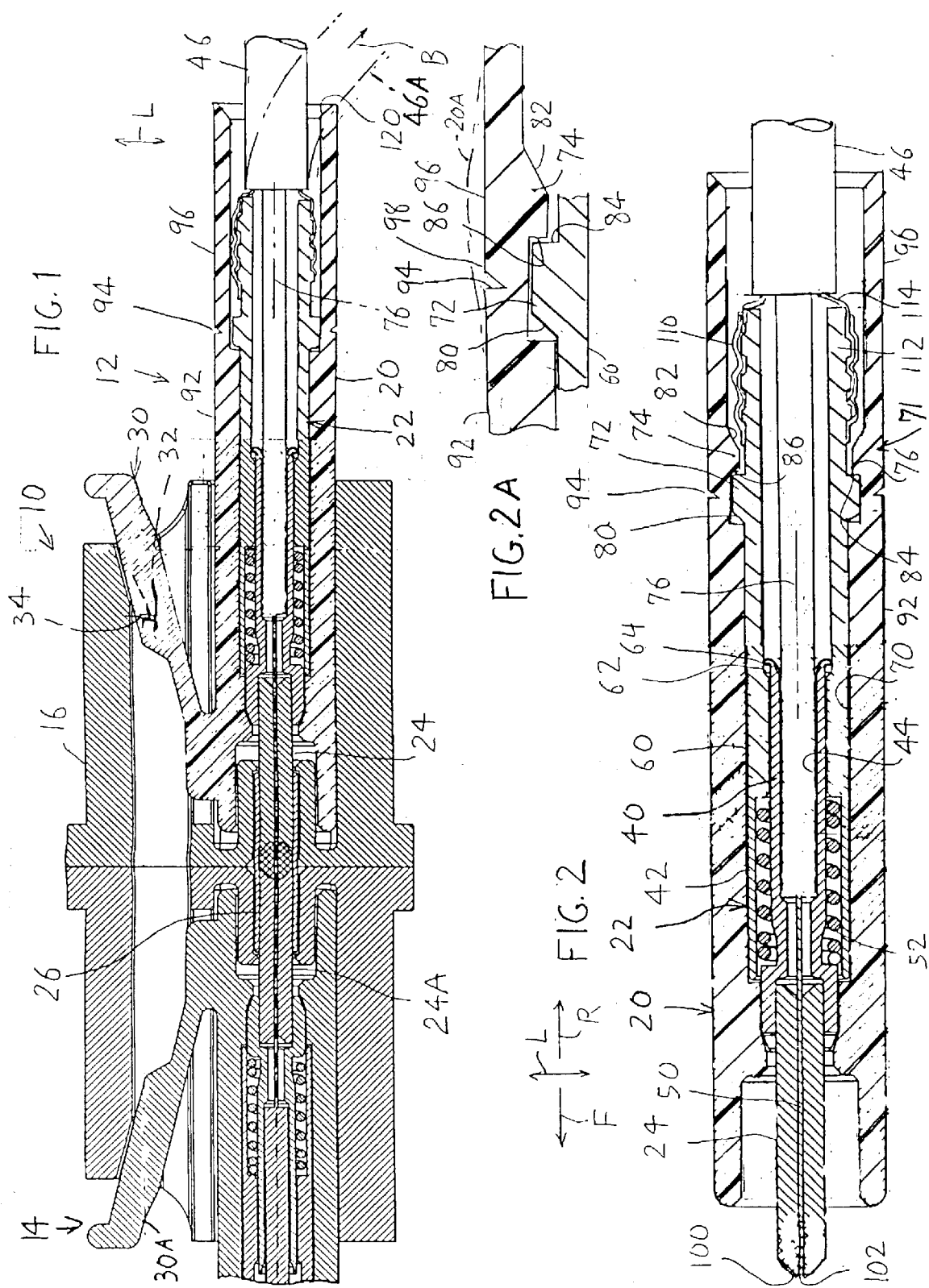

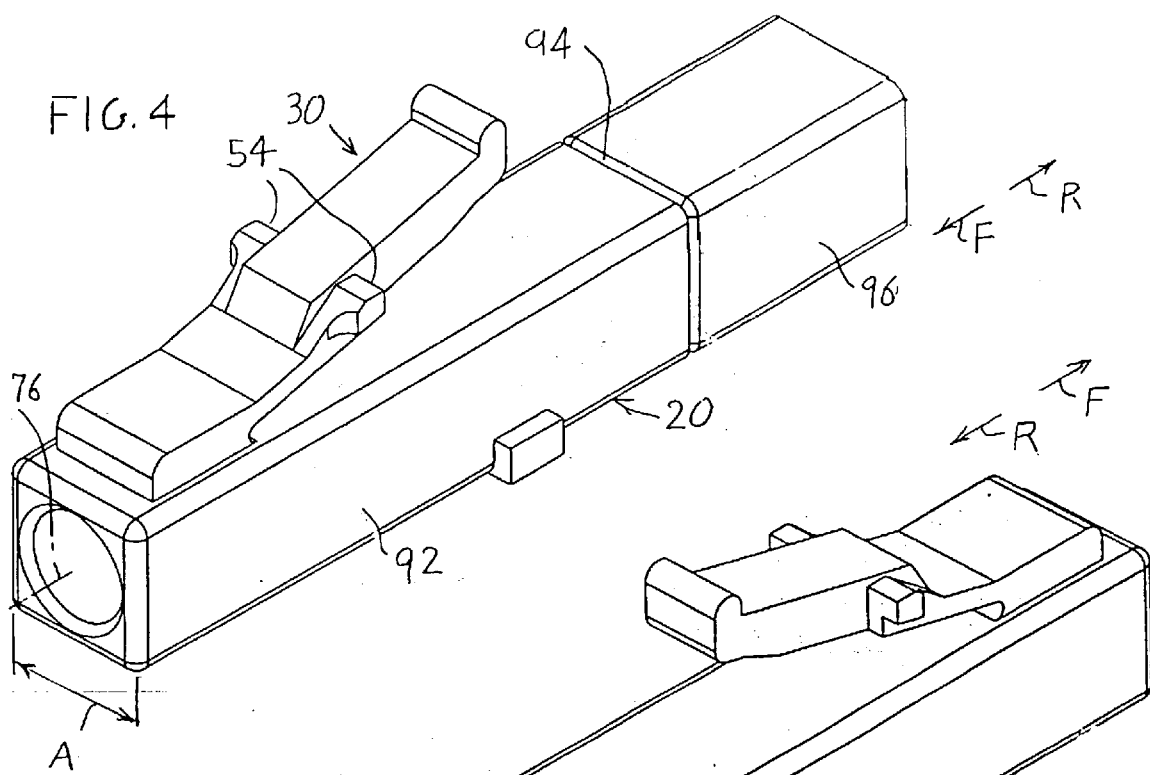
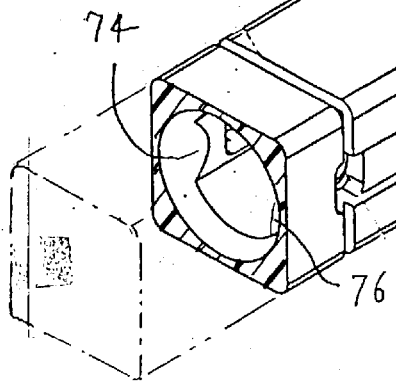
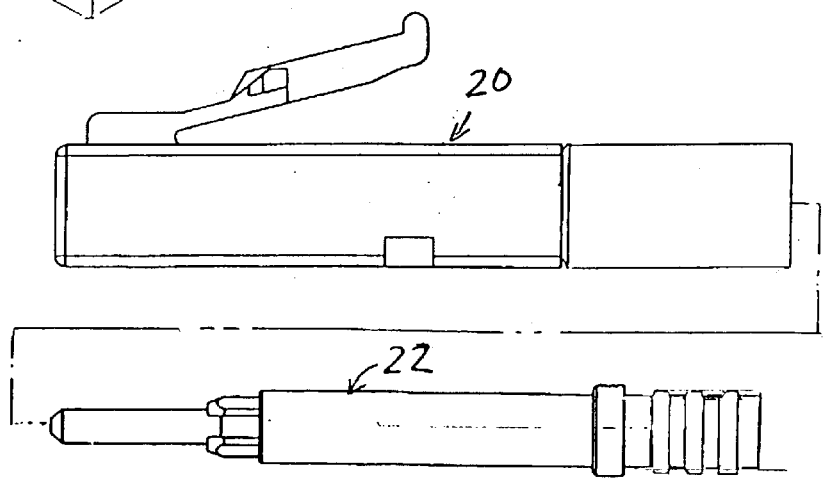

FIELD REPAIRABLE, BREAKAWAY HOUSING FOR OPTICAL FIBER CONNECTOR

BACKGROUND OF THE INVENTION

One type of optic fiber connector includes a housing with a passageway that holds an optic fiber terminus assembly, the housing having a molded-in latch of the telephone type. The terminus assembly can include a hollow sleeve-like frame extending around the terminus body and any spring of the terminus, and with the frame releasably held in the housing passageway by tines of a sheet metal retention clip. The tines must be spread apart by a special tool to remove the frame with the terminus body and other parts therewithin. The use of such a retention clip has disadvantages in that a tool is often not available, in the field, to expand the tines of the clip so as to remove the terminus assembly. Also, the presence of such a clip greatly increases the diameter of the entire assembly so the housing must have a larger cross-section.

Rearward forces of many pounds are commonly applied to the optic fiber cable trailing rearward from the connector, during connections, cable routing, etc. Sometimes a cable is pulled largely sideways and rearward, as when the cable snags on a person's clothing. Such sideward forces could damage the cable. It would be desirable if there were a tactile feedback to a person indicating that if he continues to pull, he may be damaging the cable.

SUMMARY OF THE INVENTION

In accordance with one embodiment of the present invention, an optic fiber connector is provided, of a type that includes a housing and a terminus assembly that is retained in the housing, wherein a retention part that prevents withdrawal of the terminus assembly after it has been installed in a housing, is of simple and low cost construction, adds a minimal amount to the cross-section of the housing, and enables rapid removal of a terminus assembly from a housing without the need for a special tool. The housing has a groove that extends circumferentially about the axis of the passageway. A retainer part of the housing that prevents rearward removal of the terminus assembly, lies rearward of the groove. As a result, a rear portion of the housing lying rearward of the groove, can be broken away from a main portion of the housing that lies forward of the groove. Such breakaway removes the retainer part of the housing so the terminus can be pulled out of the housing without the need for a special tool.

The terminus assembly can include a sleeve-like frame and a terminus body lying largely in the frame. The frame has a rear portion with an external flange forming forward and rearward shoulders. Shoulders on the retainer part of the housing and on the flange allow the flange to be pushed forcefully forwardly across the retainer part during installation of the terminus assembly, until full installation is achieved. However, the shoulders prevent rearward movement of the terminus assembly out of the passageway. The use of shoulders on a flange and on a retainer part allows the retainer means to add only a small extra diameter to the required cross-section of the housing. A bendable portion of the optic fiber cable lies within the housing. Accordingly, when the cable is pulled about 45° from a rearward axial direction, the cable presses sidewardly against the rear of the housing. A moderate cable tension in such direction can partially break off the housing rear part at the groove.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional view of an optic fiber connector of the present invention, shown fully installed in an alignment sleeve of a coupling and mated to a mating optic fiber connector device, and indicating, in phantom lines, how an optic fiber cable can be pulled to break the connector housing.

FIG. 2 is a sectional view of the optic fiber connector of FIG. 1.

FIG. 2A is an enlarged view of a portion of FIG. 2.

FIG. 3 is an exploded side elevation view of the housing and terminus of the connector of FIG. 2, but without the optical cable.

FIG. 4 is a front and top isometric view of the housing of the connector of FIG. 2.

FIG. 5 is a rear and top isometric view of the connector of FIG. 4, and including a sectional view of a portion of the housing and showing the rest of a rear housing part in phantom lines.

DESCRIPTION OF THE PREFERRED EMBODIMENTS

FIG. 1 illustrates an optic fiber connector system 10 wherein an optic fiber connector 12 and a mating optic fiber connector device 14 are optically connected together by a coupling 16. The connector includes a housing 20 and an optic fiber terminus assembly 22 lying in the housing 20, the terminus assembly 22 including a ferrule 24. In this case, the mating connector device 14 is identical to the connector 12, with an identical ferrule 24A. The two ferrules lie in an alignment sleeve 26 of the coupling. Each connector has a latch 30, 30A with a shoulder 32 that abuts a corresponding shoulder 34 of the coupling to hold the connectors in the coupling until the latches 30, 30A are downwardly deflected and the connector and connector devices are pulled out.

FIG. 2 shows that the terminus assembly 22 comprises a terminus 40 that includes a terminus body 42 and the ferrule 24, and with a bore 44 extending through them. An optic fiber cable 46 has cable portions, including the optic fiber 50, that extends through the bore 44 of the terminus. A coil spring 52 biases the terminus 40 forwardly F. The terminus assembly includes a hollow, sleeve-shaped frame 60 that encloses the spring 52 and part of the terminus body 42. The frame has a rearwardly-facing internal shoulder 62 that abuts a swaged rear end 64 of the body to prevent the terminus from falling rearwardly out of the frame prior to installation in the housing.

To install the terminus assembly 22 in the housing 20, applicant pushes the terminus assembly forwardly into a housing passageway 70 until an external flange 72 on the frame encounters radially inward projections 74, 76 formed on opposite sides of the inside of the passageway, and that project towards the axis 76 of the passageway. The flange has an inclined (from the lateral L direction) front shoulder 80 that can be pushed past the housing projections by spreading apart the housing at the projection 74, 76, which is facilitated by the pressure of inclined rear shoulders 82 on the projections 74, 76. Opposite sides of the housing deflect apart to a deflected position 20A shown in FIG. 2A. Thereafter, shoulders 84, 86 on the flange and projections substantially abut one another to prevent the terminus assembly from moving rearwardly out of the housing passageway. The shoulders 84, 86 extend substantially laterally, or perpendicular to the axis 76, without substantial inclines. As a result, once the terminus assembly 22 is pushed forwardly into its final position, it cannot be removed from the housing. It may be possible to insert a special tool that would spread apart the projection 74, 76 but this is generally not feasible. Of the two pairs of shoulders 80, 82, at least one pair extends at least 30°, and preferably at least 45° to the lateral direction, with shoulder 82 shown extending about 60° to the lateral direction.

Occasionally, the housing is unsatisfactory, which is usually due to the latch 30 not securely latching itself to the coupling, which may be due to deformation under elevated temperatures, an original defect, etc. Once in a while, the terminus assembly requires work on it. In accordance with the present invention, the terminus assembly can be easily removed from the housing 20. This is accomplished by the presence of a groove 94 extending around the outside of the housing, between housing portions 92, 96. The groove may be interrupted by slots in the housing. The rear housing portion 96 which extends rearward of the groove 94, has a front end 98 that lies forward of the projections 74,76, and in particular, the groove 94 lies forward of the projection shoulders 86. As a result, when the rear end portion 96 is broken off from the main portion 92, the projections 74, 76 and their front shoulders 86, are removed. This allows the terminus assembly to move rearwardly out of the main portion of the housing. The projections therefore form a retainer part 71 that prevents rearward removal of the terminus assembly and that lies rearward of the groove so the retainer part can be removed with the broken-off housing rear portion 96.

The housing 20 of FIG. 4 is molded of a plastic, with the latch 30 being integral with the rest of the housing. The housing is symmetric about a vertical plane extending through the housing axis 76. Each housing has a width A of about 0.062 inch, and each housing, in mass production, may cost about 25 cents. Each terminus assembly such as shown at 22 in FIG. 2, includes several parts, including a ferrule 24 which is commonly formed of a ceramic and which has a tip 100 that is polished to lie flat and flush with the tip 102 of the fiber 50. The frame 60 is usually machined metal. As a result, the cost of the terminus assembly 22, without the optical fiber 46, may be perhaps $10, or about 40 times as much as the housing 20. Furthermore, there is a considerable cost in attaching the optical fiber cable 46 to the rest of the terminus assembly, which includes providing an epoxy in the bore 44 of the terminus body, and crimping a crimp sleeve 110 between the rear end 112 of the frame and a strength member 114 of the cable. As a result, there is very little cost in fixing a connector of the type illustrated, by throwing away the housing and inserting the terminus assembly into a new connector housing, compared to the cost of reattaching the optical fiber cable 46 to a new terminus surrounded by a spring and frame.

As shown in FIG. 1, one way to break off the rear end 90 of the housing is to pull the cable 46 sidewardly, as indicated at 46A, so the cable presses against the rear tip 120 of the housing. The groove 94 is deep enough that a force on the cable in the direction B which is about 45° to the direction of the housing axis 76 will begin to break off the housing rear end portion 96 from the housing main portion 92. Thereafter, the housing rear end portion 96 can be ripped off as by twisting or wiggling it. Once the rear end portion 96 is removed, it can be moved rearwardly along the cable or cut and removed from the cable. The terminus assembly is then removed from the broken housing and inserted into a new housing.

As mentioned above, the cable 46 has a strength member 114 that strengthens the cable against damage when it is under tension. The crimp sleeve 110 securely holds the strength member 114 to the rear end 112 of the metal frame, so that it requires a high force such as 50 lbs. applied rearwardly parallel to the axis 76, before there is a danger that the cable or other parts of the terminus assembly will be damaged. The much lower force applied with a lateral L directional component to the housing rear end 96 to break it, allows pulling of the cable in a direction B to begin removal of the housing rear end.

It is noted that the cable 46 and parts attached to it, can sometimes become caught on a person's clothing and be pulled sidewardly. A large tug in a sideward direction such as B will begin to break off the housing rear end at the groove 94. This will provide a tactile feedback to the person, so the person will stop pulling and avoid damage to the terminus assembly.

It is noted that the flange 72 formed on the frame 60 of the terminus assembly, adds only a slight increase to the width of the rest of the frame 60. In the prior art, when a sheet metal clip with tines was used to retain parts, such as to retain the terminus body 42 directly within the housing 20, the presence of such clip resulted in a considerable increase in the required diameter of the connector, which is avoided by the simple flange 72 which projects only slightly beyond the rest of the frame 60.

Thus, the invention provides an optic fiber connector that includes a housing and an optic fiber terminus assembly installed in the housing, which enables the use of a self contained terminus assembly of low cost and small size, and allows the terminus assembly to be quickly and easily installed, in the field, in a housing and which enables easy removal of the terminus assembly from the housing. This is accomplished by forming the housing so a rear portion that prevents rearward movement of the terminus assembly out of the housing, can be broken away from the rest of the housing, to enable the terminus assembly to be pulled out of the nowbroken housing. Another housing can be used, and the terminus assembly installed in it in a simple matter by simply pushing the terminus assembly firmly forwardly into the new housing. The invention also includes a method for removing a terminus assembly from a housing, which is by breaking off a rear portion of the housing, and for reinstalling the terminus assembly in a housing, which is accomplished by merely pushing the terminus assembly forwardly into the housing to cause temporarily springing apart of projections in the housing. The construction enable workers in the field to quickly remove a terminus assembly in the field and install it in a new housing, all at low cost.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optic fiber connector which includes a housing having an axis and having a passageway extending in front and rear directions along said axis through said housing, an optic fiber terminus assembly lying in said passageway, and an optic fiber cable extending through a bore in said terminus assembly and trailing rearwardly from said terminus assembly and said housing, said housing having a retainer part that prevents said terminus assembly from moving rearwardly out of said passageway wherein:

said housing has a main portion and has a rear portion extending rearward from said main portion, and said housing has a groove that extends around said housing between said housing portions, said groove lying forward of said retainer part, so when said housing is broken at said groove said retainer part no longer prevents said terminus from moving rearward out of said housing.

2. The connector described in claim 1 wherein:

said terminus assembly includes an optic fiber terminus having a terminus body and a ferrule and also having a sleeve-like frame that surrounds at least a portion of said terminus body and that has a frame rear portion with a largely rearwardly-facing frame shoulder;

said retainer part comprises housing passageway walls forming a largely forwardly-facing retention shoulder lying in line with and rearward of said frame shoulder, said walls forming a retention shoulder being deflectable from an initial position to a deflected position wherein said retention shoulder lets said frame shoulder pass forwardly across said retention shoulder and said retention shoulder then returning largely to said initial position to prevent rearward removal of said terminus assembly from said passageway.

3. The connector described in claim 2 wherein:

said housing has an extreme rear end and said frame has an extreme rear end that lies forward of said housing extreme rear end;

said optic fiber cable has a bendable portion lying in said housing rear portion, so said cable bends and bears against said housing extreme rear end when pulled at an angle of a plurality of degrees from said axis.

4. The connector described in claim 2 wherein:

said optic fiber cable has a strength member that is fixed to said frame, and said cable does not break free of said terminus assembly when said cable is pulled rearwardly along said axis with a predetermined first high force;

said groove is deep enough that said housing breaks at said groove when a second force is applied to the rear end of said housing in a direction perpendicular to said axis, said second force being less than half said first force.

5. An optic fiber connector which includes a housing having an axis and having a passageway extending in front and rear directions though said housing, and an optic fiber terminus assembly which includes a sleeve-like frame and a terminus that lies in said frame and that includes a terminus body lying largely in said frame and a ferrule projecting forward of said frame, said terminus assembly also including a flexible optic fiber cable trailing rearwardly from said frame, wherein:

said housing passageway has housing walls that form housing shoulders and said frame has frame walls that form frame shoulders, said shoulders oriented to allow said terminus assembly to be pushed forwardly into said passage to a fully inserted position and to then prevent rearward withdrawal of said terminus assembly from said passageway;

said housing has a main portion and has a rear end portion that extends rearward from said main portion and is breakable along a break line, from said housing main portion, by a force applied perpendicular to said axis to the rear of said rear end portion, said walls forming said housing shoulders lying on said housing rear end portion, rearward of said break line.

6. The connector described in claim 5 wherein:

said housing has an outer surface;

said break line extends circumferential to said axis, and along said break line said housing has a groove in its outer surface.

7. The connector described in claim 5 wherein:

said housing shoulders include front housing shoulders extending perpendicular to said axis and rear housing shoulders;

said frame shoulders include rearframe shoulders extending perpendicular to said axis and front frame shoulders;

of said rear housing shoulders and said front frame shoulders, at least some of said shoulders extend more than 30° to a direction perpendicular to said axis.

8. An optic fiber connector housing which has a through bore for receiving an optic fiber terminus assembly, wherein:

said housing is molded of a polymer and has passageway walls forming an elongated through passageway with an axis, said housing having a plurality of projections that each projects from said passageway walls toward said axis, each projection having a front forming a front shoulder that extends primarily radial to said axis, and each projection having a rear forming a rear shoulder that extends at an angle of at least 30° to a radial direction;

said housing having a groove extending primarily circumferential to said axis to allow said housing to break into two parts spaced along said axis, said groove lying forward of said projection front shoulders.

9. The connector housing described in claim 8 including:

an optic fiber terminus assembly that can be installed forwardly into said passageway, and that includes a sleeve-shaped frame with an external flange that has a rearward shoulder that extends radial to said axis and that lies substantially against said projection rear shoulders.

10. A method for use with an optic fiber connector that includes a housing with a through passageway and a terminus assembly that includes a terminus body lying said passageway and a ferrule projecting forwardly from said body and an optic fiber cable with a portion extending through bores in said body and ferrule and trailing rearwardly from said body, to uncouple said terminus assembly from said housing, comprising:

establishing said terminus assembly with a rear portion having a rear terminus shoulder that faces rearwardly;

establishing said housing with a main housing portion and with a rear housing portion that extends rearwardly from said main portion, said rear portion having an internal flange forming a front shoulder that faces forwardly and that lies immediately rearward of said rear terminus shoulder;

breaking said housing rear portion away from said housing main portion to remove said internal flange, so said terminus assembly can be slid rearwardly out of said housing main portion.

11. The method described in claim 10 wherein:

said step of breaking comprises pulling a portion of said optic fiber cable that extends rearwardly from said terminus assembly, at an angle of a plurality of 10's of degrees to said axis, so the cable presses against one side of a rear end of said housing rear portion until said at least one side breaks.

* * * * *